June 19, 1962     W. P. CLINTON ET AL     3,039,882
PROCESS FOR PACKAGING POWDERED, SOLUBLE COFFEE
Filed June 2, 1958
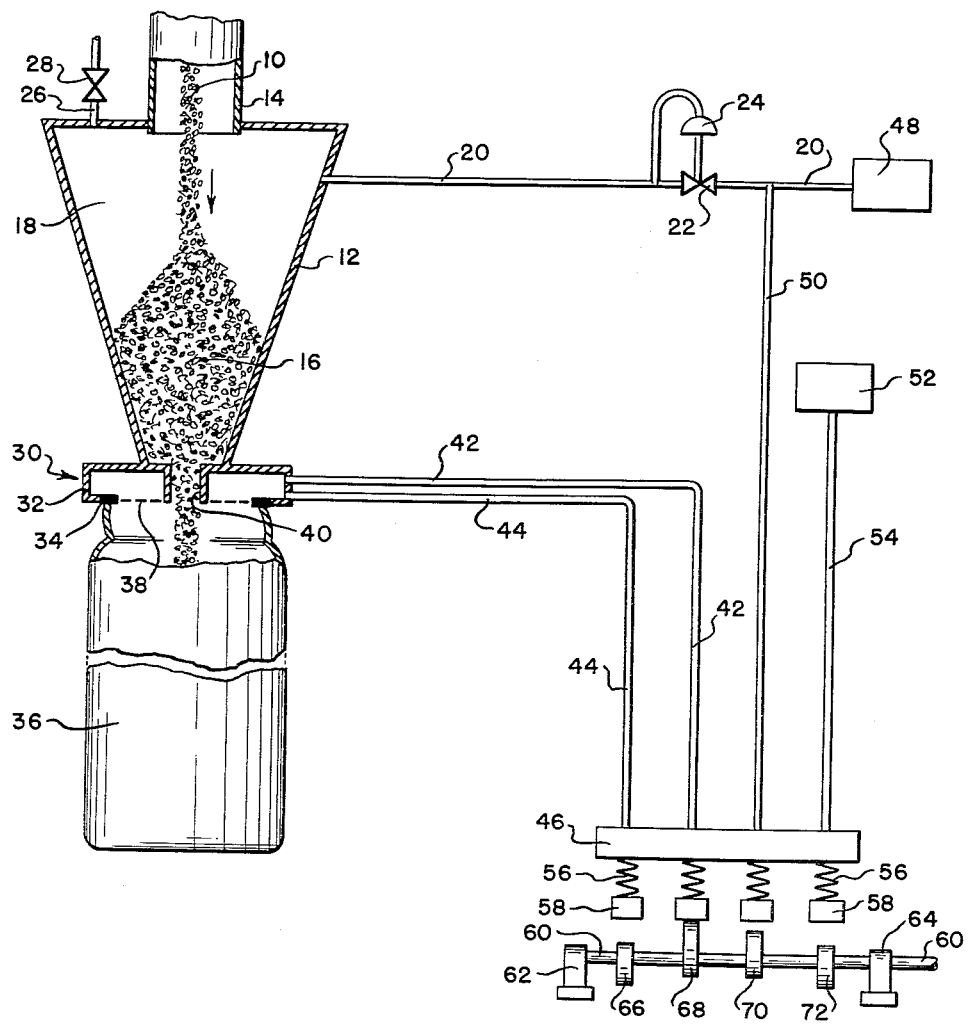
INVENTORS
WILLIAM P. CLINTON
ROBERT S. PERRY
ESRA PITCHON

United States Patent Office 3,039,882
Patented June 19, 1962

3,039,882
PROCESS FOR PACKAGING POWDERED, SOLUBLE COFFEE
William P. Clinton, Morris Plains, and Robert S. Perry, Mountain Lakes, N.J., and Esra Pitchon, Flushing, N.Y., assignors to General Foods Corporation, White Plains, N.Y., a corporation of Delaware
Filed June 2, 1958, Ser. No. 739,243
11 Claims. (Cl. 99—189)

This invention relates to packaging of particulate material. More specifically it relates to the packaging or transfer of a body of aromatized particles, such as coffee, which particles are particularly characterized by their high rate of deterioration on contact with air, their free-flowing character, and their low friability. In the production of soluble coffee, the particles of coffee may be subjected to various types of treatment including, e.g., aromatization. The finished coffee particles may be typically stored, e.g., in a large body in a hopper and subsequently packaged in a container.

According to one technique for packaging coffee, a body of product coffee particles may be passed downwardly from a hopper into a container which is in airtight contact with an opening or passageway at the bottom of the hopper. The technique for moving the coffee particles from the hopper to the container may include a sequence of operations wherein pressure and vacuum may be applied to the system. When soluble coffee particles are packaged by such techniques, certain sequences of pressures and vacuums which have been used have been such that coffee particles have been blown back from the container to the hopper. This results in uneven weights of coffee in the containers and further interferes with reproducible flow from the hopper to the container. Furthermore, the coffee particles are subjected during the sequence of operations to maximum contact with the oxygen of the air, which serves as the actuating force behind the filling operation. Under these conditions, physical loss of aromatizing components, as well as deterioration thereof, is undesirably high during the filling operation.

Furthermore, coffee which has been packed under these conditions will be found to have a high content of oxygen; i.e., oxygen which was present during the filling operation has become entrapped or entrained within the mass or body of coffee particles which has entered the container or jar. This contributes to a higher rate of deterioration of the coffee oils present in the soluble coffee with resultant shortening of shelf life.

It is an object of this invention to provide a technique for packaging particulate material such as coffee under conditions which insure a maximum shelf life. Another object of this invention is to provide a packaging technique characterized by its high rate of flow, its efficiency, and its ability to reproducibly pack constant weights of coffee under conditions which insure maximum shelf life. Other objects will be apparent to those skilled-in-the-art on inspection of the accompanying drawing and the following description.

According to certain of its aspects, the technique of this invention for filling soluble coffee includes the steps of preferably passing aromatized soluble coffee particles in disperse condition into contact with an inert de-oxygenating gas, forming a body of the said coffee particles to be packaged, maintaining above the surface of said body a slight positive gas pressure, forming a lower pressure in said container than is above the body of said coffee whereby coffee passes under the influence of the pressure differential from said body to said container thereby diminishing the said pressure differential, and intermittently reforming said pressure differential until said container is filled with coffee.

Although the technique of this invention may be employed in connection with a wide variety of particulate materials, which are to be packaged, it is particularly useful in connection with the treatment and packaging of a free-flowing friable, aromatized, soluble coffee. Such a powdered, soluble coffee may be prepared, by, e.g., the extraction of solubles from ground coffee beans followed by drying of the extract liquor. Typically the liquor may be spray-dried to form small coffee particles in the form of hollow spheres having a median particle size of the order of 50 mesh—the particles roughly being of the order of 0.01–0.02 inch.

The advantages of the instant invention are particularly apparent and obtained in the greatest degree when the coffee particles have been aromatized by addition thereto or contact therewith of aromatizing materials.

Typically, such aromatizing materials may be aromatizing coffee oils obtained from a variety of sources, natural or artificial, or mixtures thereof. In either case the oils will contain at least a substantial proportion of those components which are responsible for the odor and aroma of coffee. It is these oils which impart to the powdered soluble coffee the aromatizing characteristics, which appear when the container of soluble coffee is opened and which also add to the aroma developed after the formation of the coffee beverage.

In accordance with this invention, the particles of coffee which may contain aromatizing oils, are preferably first passed in a disperse condition into contact with a de-oxygenating gas. Preferably the dispersal of the particles to effect contact with the gas may be obtained by permitting the particles of soluble coffee to fall freely downwardly in a loose form through a contact zone.

This may be done by use of various expedients including, i.e., forming an umbrella-like thin layer of particles by passing the downwardly flowing coffee over an inverted baffle, e.g., a conical baffle. These expedients permit intimate contact of the descending stream of powdered coffee particles with the de-oxygenating gas.

The gas with which the particles are contacted is a de-oxygenating gas, preferably an inert gas such as carbon dioxide. During the passage of the coffee particles downwardly through the body of inert gas in the contact zone, the gas displaces oxygen which may be associated with the particles. Although this contact may be effected according to direct counter-current techniques wherein the de-oxygenating gas is admitted to the bottom of a tower or a container through which the falling particles pass, the gas being removed from the upper portion of the container together with any undesired (i.e., oxygen containing) gas, the falling stream of powdered coffee particles may be passed through an essentially constant or static atmosphere of inert gas.

The de-oxygenated coffee particles are thence preferably passed to a body of coffee particles maintained in an appropriate storage container or hopper.

According to the preferred technique for packaging the particles of powdered coffee, the body of coffee particles is maintained within the hopper and preferably a slight positive gas pressure is maintained above the upper face or surface of the body of particles. In the preferred embodiment, the contact zone referred to supra may comprise the upper portion of the hopper, which portion is otherwise unoccupied by the body of coffee particles and the inert gaseous atmosphere which contacts and de-oxygenates the falling coffee particles may be the same gas which exerts a slight positive pressure on the surface of the body of particles.

As hereinafter described in greater detail, it is preferred that the pressure above the surface of the body of particles be superatmospheric. It will typically be a slight positive pressure up to about 0.5 inch of water. Although this positive pressure may be obtained under static conditions, it is possible to have a slight flow of gas to purge the contact zone and hopper of any oxygen-containing gas which may be present.

Packing of the powdered soluble coffee which is in the body of coffee in the hopper may be effected by maintaining a container or jar in air-tight relationship with an opening in the lower portion of the hopper. Preferably the hopper will be elevated with respect to or superimposed upon the container to be filled with the coffee particles. Filling is effected by creating a lower pressure in the container than in the hopper preferably by drawing a vacuum in the container whereby coffee particles pass into the container under the influence of the pressure differential, the differential decreasing as the particles flow, preferably flushing the container with an inert gas when the differential pressure has reached a low point, and repeating the differential pressure production and flushing operations until the container is filled.

It is a particular feature of this invention that the use of slight positive pressure of de-oxygenating and preferably inert gas in the hopper permits attainment of de-oxygenating conditions within the hopper and at the surface of the body of coffee particles and furthermore is particularly advantageous in maintaining a constant and reproducible flow pattern from the body in the hopper storage zone into the sub-posed coffee container.

During the filling operation, the pressure differential, which will be created between the container and the hopper, will typically be from 1 inch to 28 inches of mercury and more commonly and preferably about 5–20 inches of mercury. During the total filling time of 4–5 seconds per jar or per container, the vacuum may be redrawn 3–4 times. During the filling operation, it is found that under the influence of the vacuum or pressure differential and the very slight and substantially constant positive pressure of up to 0.5 inch of water above the surface of the body, the coffee particles reproducibly and uniformly flow from the lower portion of the body into the container and the flow of particles from the hopper being substantially entirely by means of mass flow.

It is a particular feature of this invention that the soluble coffee produced and packaged in accordance with the technique herein described possesses a longer shelf life, a more coffee-like flavor and aroma, and a greater freedom from staling and rancidity when stored for extended period of time than does coffee packaged by prior art techniques.

In accordance with a specific embodiment of this invention as set forth in the drawing, powdered, soluble coffee may be admitted in the form of a downwardly flowing disperse stream 10 of particles, which may be admitted to hopper 12 through inlet 14. In practice, inlet 14 will be an air-tight passageway leading from a preferably substantially oxygen-free environment, and the stream 10 of coffee particles may be placed in disperse form by any desired technique, e.g., the impingement on and over a baffle plate. The downwardly falling stream 10 of coffee particles is collected in a body 16 in the lower portion of hopper 12. The atmosphere 18 within hopper 12 is oxygen-free and this may be effected by passage thereto of inert gas such as carbon dioxide or nitrogen from source 48. The carbon dioxide admitted to the atmosphere 18 within hopper 12 is maintained within the hopper under slight positive pressure up to 0.5 inch of water, preferably 0.3 inch of water, the pressure being controlled by valve 22 and pressure control means 24 in line 20. In the preferred embodiment, the concentration of oxygen in atmosphere 18 will be reduced to less than 4% and preferably to about 0.5% by volume by the inert gas.

Packaging of the free-flowing, soluble coffee particles, which typically may have a mesh-size ranging from 40 mesh up to about 80 mesh with a median particle size of 50 mesh is effected by means of a filling head generally designated 30 including a housing 32 bearing on its lower surface a gasket 34 of diameter sufficient to accommodate a standard coffee container or jar 36. The housing 32 also has a perforated or screen-like area 38 on its lower surface within the confines of gasket 34. Preferably centrally located filling spout or conduit 40 permits communication between storage hopper 12 and container 36. Housing 30 bears conduits 42 and 44 respectively for communication between the housing 30 and a source of pressure 48 and vacuum 52. Conduit 42 and 44 lead directly from filling head 30 to manifold 46, which latter is shown entirely schematically. Also leading to manifold 46 are: line 50, which connects the manifold 46 (through line 20) to a source 48 of pressurized inert gas such as $CO_2$; and line 54 which connects the manifold 46 to a source of vacuum 52, schematically shown.

Manifold 46 contains valves, not shown, each adapted to function with one of the springs 56. Mounted in cooperating relationship with springs 56 are blocks 58. Shaft 60 mounted in bearings 62 and 64 (and adapted to be rotated by suitable means not shown) bears cams 66, 68, 70, and 72, each of which acts upon its corresponding block 58 and spring 56 to open or close an appropriate valve in manifold 46 in prearranged manner as hereinafter indicated.

During packaging of the particles of soluble coffee in accordance with this embodiment of the invention, inert gas, typically $CO_2$ is supplied under pressure from source 48. That portion of the $CO_2$ to be admitted directly to the hopper is depressurized through valve 22 to a pressure of about 0.3–0.5 inch of water. The vacuum source 52, which may, e.g., be a vacuum pump, is turned on thus providing a source of vacuum through line 54 to manifold 46. Rotation of cam shaft 60 is started and the valves in manifold 46 are opened according to a prearranged pattern.

According to one technique, the pattern may be such that a vacuum may be drawn first in filling head 30 and jar 36 by opening the appropriate valves which connect line 44 with vacuum line 54. As the cam shaft 60 rotates, the valves which have been open may then be closed, thus interrupting the connection between line 44 and line 54. Then, line 42 may be connected to pressure (which may be the atmosphere but preferably a source of inert gas) source 48 through lines 50 and 20 by simultaneously opening of appropriate valves in manifold 46. This sequence may occur 3–4 times over a period of 4–5 seconds.

As the sequence of pressures and vacuums occur, as hereinbefore indicated, coffee is withdrawn from the lower portion of body 16 and passes through conduit 40 into jar 36. The intermittent formation of vacuum and pressure in jar 36 through filling head 30 and screen 38 permits rapid flow of material through conduit 40. The slight positive pressure, up to 0.5 inch of water, which exists above the surface of body 16 in hopper 12 prevents any back flow of gas and/or powder upwardly through conduit 40.

Preferably, the vacuum drawn through line 54 and line 44 in vessel 36 may be, e.g., 22 inches of mercury. The pressure of gas passed to the filling head 30 through lines 20, 50, and 42 will be sufficient to release the vacuum in container 36 as well as to admit thereto an amount of inert gas sufficient to render the interior of jar 30 substantially oxygen-free during the flushing which occurs while the jar is being filled with coffee.

It is a particular feature of this invention that the soluble coffee particles are placed in containers with a minimum destruction of the coffee particles. The packaged coffee contains oxygen in minimum quantities, usually less than about 4% when the oxygen content in the hopper is less than about 0.5%. The presence of inert gas within the container, when admitted thereto with the coffee in the manner hereinbefore indicated particularly provides a coffee product which is capable of being stored for extended periods with minimum deterioration and staling. It is also a feature of this process that because of the particular conditions of operation, including the presence of a slight positive pressure above the surface of the body of coffee particles in the hopper, filling of the containers is conducted under almost 100% reproducible conditions, and the number of containers having more or less than the standard weight of coffee is considerably reduced.

Although this invention has been described in connection with a single embodiment, it will be apparent to those skilled-in-the-art that various modifications may be made thereto which fall within the scope of the claims.

What is claimed is:

1. In the process of preparing a filled container of free-flowing powdered soluble coffee containing soluble coffee particles wherein coffee is obtained in the form of a body to be packaged in a container which is in air-tight communicating relationship with the lower portion of said body, the improvement which comprises maintaining above the surface of said body a slight positive inert gas pressure, forming a lower pressure in said container than is above said body whereby coffee passes under the influence of the pressure differential from said body to said container thereby diminishing the said pressure differential, and intermittently reforming said pressure differential until said container is filled with coffee.

2. In the process of claim 1, the improvement which comprises maintaining above the surface of the said body an inert gas environment under superatmospheric pressure up to about 0.5 inch of water.

3. In the process of claim 1, the improvement which comprises maintaining above the surface of the said body an inert gas environment containing less than about 0.5% by volume oxygen under superatmospheric pressure up to about 0.5 inch of water.

4. In the process of claim 1, the improvement which comprises maintaining above the surface of the said body an inert gas environment under superatmospheric pressure of about 0.3 inch of water.

5. The process of preparing a filled container of free-flowing, powdered, soluble coffee containing soluble coffee particles comprising passing said coffee particles to a body of the same within an air-tight environment, maintaining a container in air-tight communicating relationship with a lower portion of said body, maintaining above the surface of said body a slight positive inert gas pressure, evacuating said container to form therein a lower pressure than is above the body of said powder whereby coffee passes under the influence of the pressure differential from said body to said container thereby diminishing the said pressure differential, and intermittently reforming said pressure differential until said container is filled with coffee.

6. The process of preparing a filled container of free-flowing, powdered, soluble coffee containing soluble coffee particles which comprises passing said coffee particles to a body of the same within an air-tight environment, maintaining a container in air-tight communicating relationship with the lower portion of said body, maintaining above the surface of said body a slight positive inert gas pressure, forming a lower pressure in said container than is above the body whereby coffee passes under the influence of the pressure differential from said body to said container thereby diminishing the said pressure differential, venting said container to a source of inert gas, and intermittently reforming said pressure differential and venting said container until the said container is filled with coffee.

7. The process claimed in claim 6 wherein the slight positive pressure above said body is maintained by an atmosphere selected from the group consisting of carbon dioxide and nitrogen.

8. The process claimed in claim 6 wherein the inert atmosphere to which the container is vented contains the same gas as is present above the surface of said body.

9. The process of preparing a filled container of free-flowing, powdered, soluble coffee containing oil aromatized soluble coffee particles which comprises contacting a disperse stream of oil aromatized soluble coffee particles with an inert de-oxygenating gas whereby the coffee particles are rendered oxygen free, passing said coffee particles to a body of coffee particles maintained within an air-tight environment, maintaining above the surface of said body a slight positive inert gas pressure, maintaining a container in air-tight communicating relationship with the lower portion of said body, forming a lower pressure in said container than is above the body of said powder whereby coffee passes under the influence of the pressure differential from said body to said container thereby diminishing the said pressure differential, and intermittently reforming said pressure differential until said container is filled with coffee.

10. The process claimed in claim 9 wherein the soluble coffee particles in disperse condition are de-oxygenated within the environment containing the body of said coffee particles.

11. The process claimed in claim 9 wherein the aromatized soluble coffee particles in disperse condition are passed downwardly through the upper portion of the environment containing the body of said powder.

References Cited in the file of this patent

UNITED STATES PATENTS

| | | |
|---|---|---|
| 2,062,109 | Rogers | Nov. 24, 1936 |
| 2,335,192 | Moore | Nov. 23, 1943 |
| 2,338,012 | Schmitt | Dec. 28, 1943 |
| 2,423,358 | Wheaton et al. | July 1, 1947 |
| 2,518,100 | Tomkins | Aug. 8, 1950 |
| 2,684,803 | Birkland et al. | July 27, 1954 |
| 2,696,443 | Allbright | Dec. 7, 1954 |
| 2,830,911 | Fogelberg | Apr. 15, 1958 |